(12) United States Patent
Tanigawa

(10) Patent No.: US 12,187,245 B2
(45) Date of Patent: Jan. 7, 2025

(54) VEHICLE

(71) Applicant: TOYOTA JIDOSHA KABUSHIKI KAISHA, Toyota (JP)

(72) Inventor: Yukihiro Tanigawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/446,855

(22) Filed: Aug. 9, 2023

(65) Prior Publication Data

US 2024/0083396 A1 Mar. 14, 2024

(30) Foreign Application Priority Data

Sep. 13, 2022 (JP) ................................. 2022-145182

(51) Int. Cl.
*B60T 1/00* (2006.01)
*B60T 7/10* (2006.01)
*B62D 25/20* (2006.01)
*F16H 63/34* (2006.01)

(52) U.S. Cl.
CPC .............. *B60T 1/005* (2013.01); *B60T 7/102* (2013.01); *B62D 25/20* (2013.01); *F16H 63/3416* (2013.01); *F16H 63/3491* (2013.01)

(58) Field of Classification Search
CPC ............. F16H 63/3491; F16H 63/3416; F16H 63/3458; F16H 63/3466; F16H 63/3475; B60T 1/005; B60T 1/062; B60T 7/102; B62D 25/20

USPC ........................................................ 192/219.6
See application file for complete search history.

(56) References Cited

U.S. PATENT DOCUMENTS

| 2014/0182408 | A1* | 7/2014 | Galden ................... F16H 61/22 |
| | | | 74/473.21 |
| 2015/0362069 | A1* | 12/2015 | Gross ................... F16H 63/3425 |
| | | | 192/219.6 |
| 2020/0114884 | A1 | 4/2020 | Kawanishi et al. |

FOREIGN PATENT DOCUMENTS

| JP | 2013170699 A | 9/2013 |
| JP | 2017166647 A | 9/2017 |
| JP | 2020059394 A | 4/2020 |

* cited by examiner

*Primary Examiner* — Richard M Lorence
(74) *Attorney, Agent, or Firm* — Hunton Andrews Kurth LLP

(57) ABSTRACT

The vehicle includes a SBW actuator capable of switching between a locked state in which the drive wheels of the vehicle are restrained from rotating and an unlocked state in which the rotation of the drive wheels is not restrained by the actuator, a parking lock releasing operation unit for switching the locked state of SBW actuator to an unlocked state by manual operation, and an undercover covering a lower portion of the parking lock releasing operation unit, and the undercover is provided with a through hole, and the parking lock releasing operation unit is exposed downward from the through hole.

6 Claims, 4 Drawing Sheets

VEHICLE

CROSS-REFERENCE TO RELATED APPLICATION

This application claims priority to Japanese Patent Application No. 2022-145182 filed on Sep. 13, 2022, incorporated herein by reference in its entirety.

BACKGROUND

1. Technical Field

The present disclosure relates to a vehicle.

2. Description of Related Art

For example, there is known a method of manually releasing a locked state of a parking lock mechanism capable of switching between the locked state in which rotation of a wheel of a vehicle is restrained and an unlocked state in which rotation of the wheel is not restrained (see Japanese Unexamined Patent Application Publication No. 2017-166647 (JP 2017-166647 A)).

SUMMARY

However, depending on the position of an operation unit for manually releasing the locked state of the parking lock mechanism, it may be difficult for the user to access the operation unit. For this reason, for example, in order to access the operation unit, it may be troublesome to jack up the vehicle or remove a component.

In view of the above issue, an object of the present disclosure is to provide a technique capable of manually releasing a locked state of a parking lock more easily.

In order to achieve the above object, a vehicle according to an embodiment of the present disclosure includes: a parking lock unit that is able to switch between a locked state and an unlocked state by an actuator, the locked state being a state in which rotation of a wheel of the vehicle is restrained, and the unlocked state being a state in which the rotation of the wheel is not restrained; an operation unit for switching the locked state of the parking lock unit to the unlocked state by manual operation: and an under cover covering a space below the operation unit. A through hole is provided in the under cover. The operation unit is exposed to the space below the under cover through the through hole.

According to the above-described embodiment, it is possible to manually release the locked state of the parking lock mechanism more easily.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments will be described with reference to the drawings. Configuration of the vehicle A configuration of the vehicle 1 according to the present embodiment will be described with reference to FIGS. 1 to 4.

Figure 1:
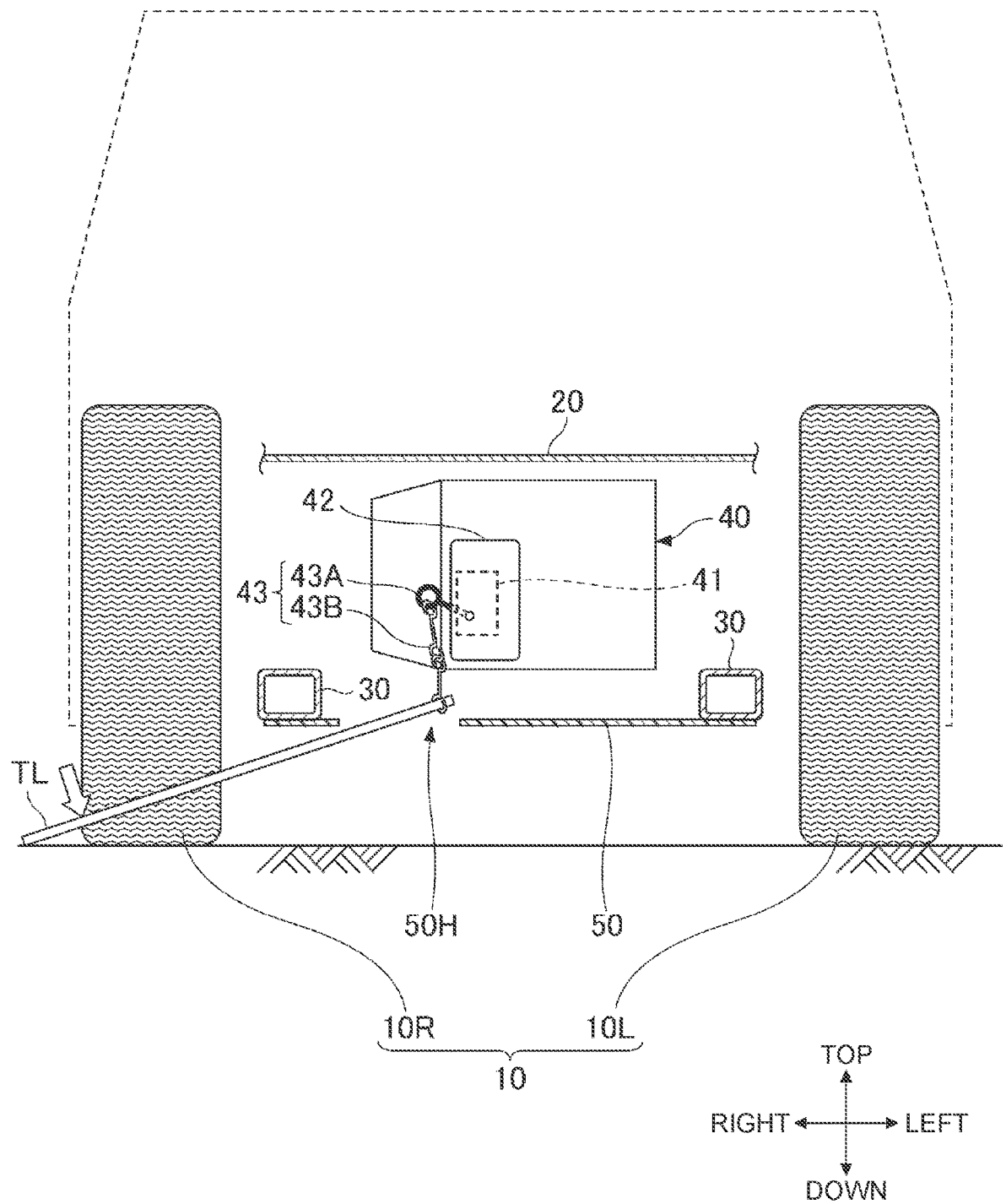
FIG. 1 is a front view illustrating an example of a configuration of a vehicle.
Figure 2:
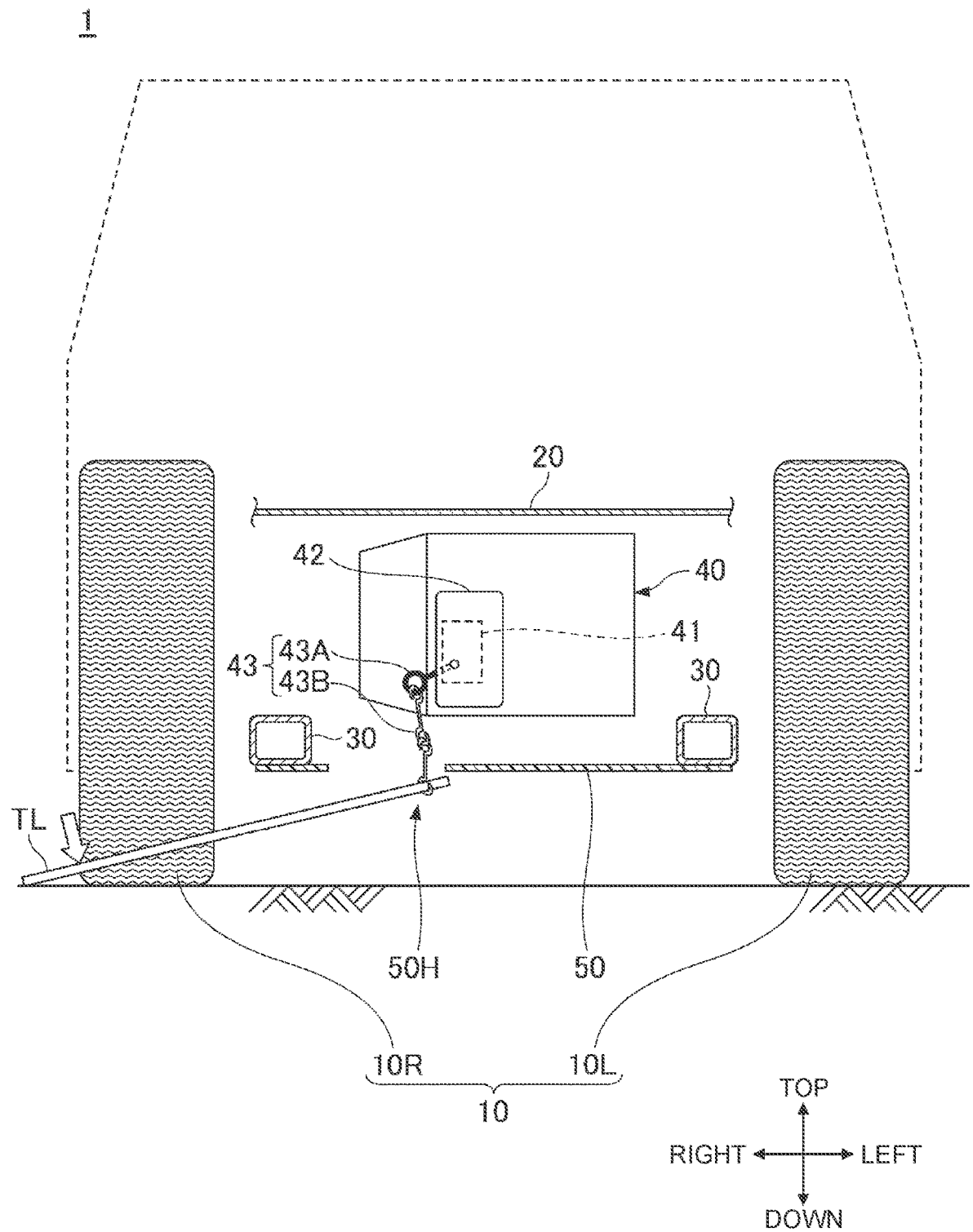
FIG. 2 is a front view illustrating an example of a configuration of a vehicle.
Figure 3:
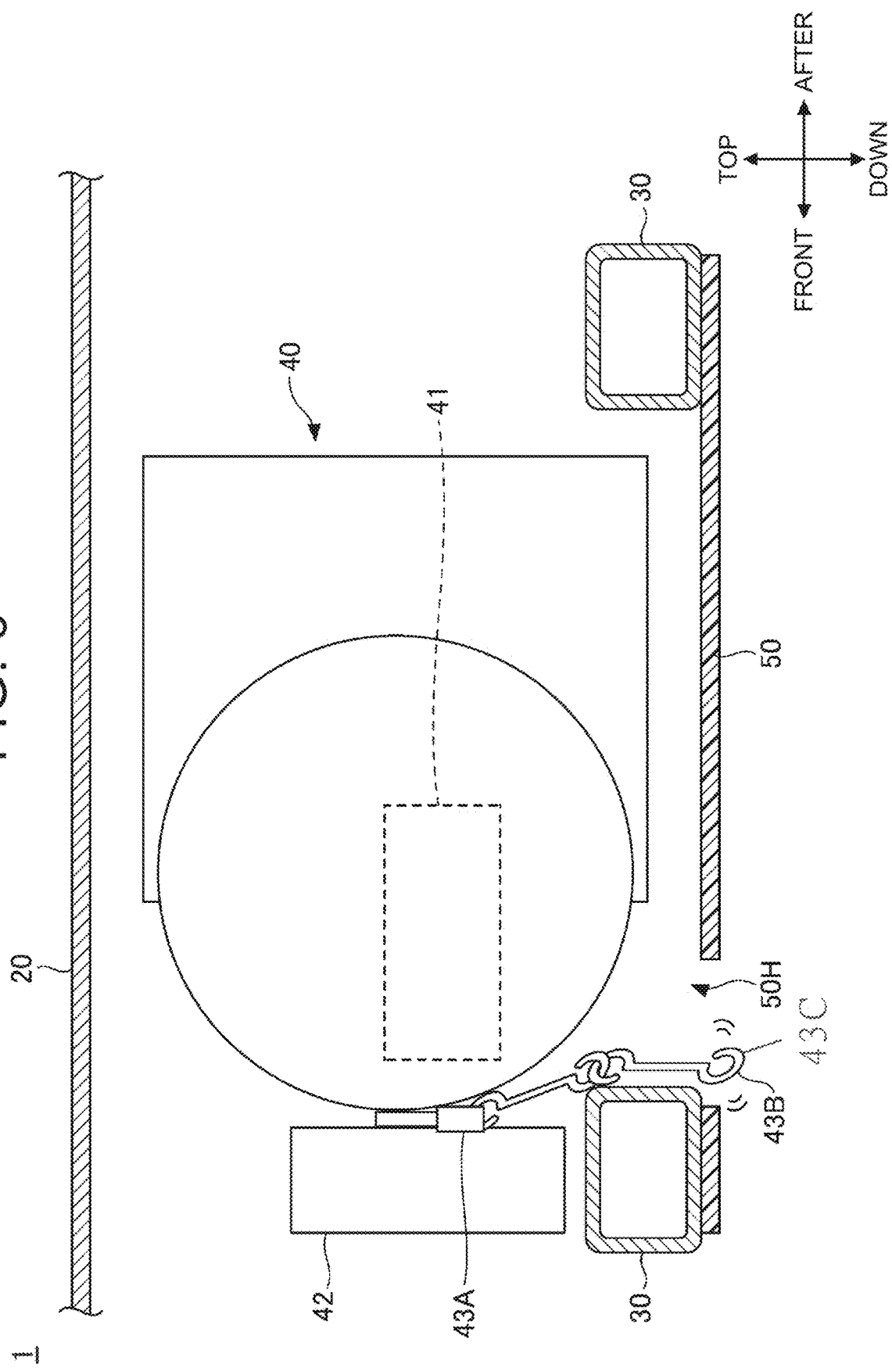
FIG. 3 is a side view illustrating an example of a configuration of a vehicle.
Figure 4:
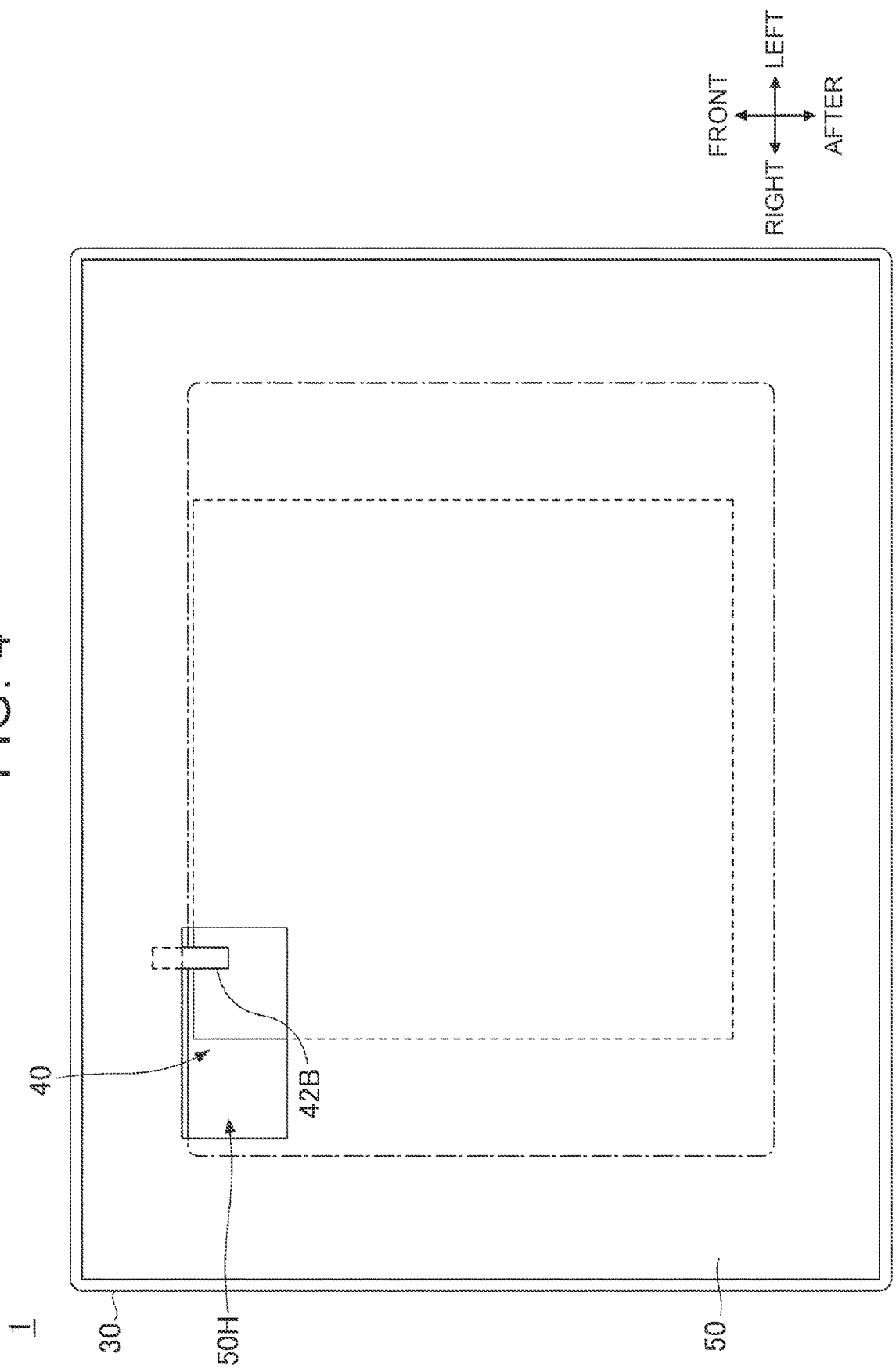
FIG. 4 is a bottom view illustrating an example of a configuration of a vehicle.

FIG. 1 and FIG. 2 are front views illustrating an example of a configuration of a vehicle 1. Specifically, FIG. 1 and FIG. 2 each represent an exemplary configuration of a rear wheel of the vehicle 1 when the lever 43A is in a position corresponding to a locked state and an unlocked state of the parking lock mechanism 41. FIG. 3 is a side view illustrating an example of the configuration of the vehicle 1. Specifically, FIG. 3 illustrates the state of the vehicle 1 when the lever 43A is in a position corresponding to the unlocked state of the parking lock mechanism 41. FIG. 4 is a bottom view illustrating an example of the configuration of the vehicle 1.

In FIGS. 1 to 3, for convenience, the floor panel 20, the cross member 30, and the under cover 50 are drawn as cross-sectional views at positions corresponding to the parking lock releasing operation unit 43. In FIG. 4, Shift By Wire (SBW) actuator 42 and the lever 43A are not shown. In addition, in FIG. 4, parts hidden in the under cover 50 of the drive device 40 including the cross member 30 and the connecting member 43B are represented by dashed lines and dashed-dotted lines, respectively.

The vehicle 1 is a so-called automobile. The vehicle 1 may be a conventional vehicle that travels only by the power of an internal combustion engine, or may be an electrified vehicle that drives and travels driving wheels by the power of an electric motor. Electrified vehicle include, for example, Battery Electric Vehicle (BEV), Hybrid Electric Vehicle (HEV), Plug-in Hybrid Electric Vehicle (PHEV), Fuel Cell Vehicle (FCV), and the like.

The vehicle 1 includes drive wheels 10, a floor panel 20, a cross member 30, a drive device 40, and an under cover 50.

The drive wheels 10 are rotated by a driving force output from the drive device 40 to cause the vehicle 1 to travel. The drive wheel 10 includes a left drive wheel 10L and a right drive wheel 10R.

For example, as illustrated in FIGS. 1 and 2, the drive wheels 10 are rear wheels. The drive wheels 10 may be front wheels. The drive wheels 10 may be both front wheels and rear wheels. When the front wheels and the rear wheels are driving wheels, the output (driving force) of the drive device 40 may be distributed to the front wheels and the rear wheels, or the drive device 40 corresponding to each of the front wheels and the rear wheels may be provided.

The floor panel 20 corresponds to a floor portion in the vehicle cabin of the vehicle 1, and partitions the inside of the vehicle cabin and the outside of the vehicle cabin in the vertical direction in a lower portion of the vehicle 1.

The cross member 30 is a structural member attached to the vehicle body of the vehicle 1. The cross member 30 is made of, for example, a steel plate, and other components such as a drive device 40 and a suspension device that suspends the drive wheels 10 are attached to the cross member 30. Accordingly, other components can be attached to the vehicle body of the vehicle 1 via the cross member 30.

For example, as shown in FIGS. 1 to 4, the cross member 30 includes two members extending in the left-right direction in a plan view (beam), and two members connecting each of the left and right ends of the two members in the front-rear direction (beam).

The drive device 40 drives the drive wheels 10.

For example, the drive device 40 includes an electric motor as a power source and a speed change device that changes (decelerates) the rotation of the electric motor, and the output of the speed change device is transmitted to the drive wheel 10L, 10R via the drive shaft. At this time, the electric motor as the power source may be shared by the drive wheel 10L, 10R or may be provided for each drive wheel 10L, 10R. In the former case, the drive device 40 includes a differential.

Further, the drive device 40 may drive the drive wheels 10 by decelerating or increasing the power transmitted from an external power source such as an internal combustion engine or an electric motor.

The drive device 40 includes a parking lock mechanism 41, an SBW actuator 42, and a parking lock releasing operation unit 43.

The parking lock mechanism 41 can switch between a locked state in which the rotation of the drive wheels 10 of the vehicle 1 is restricted and an unlocked state in which the rotation of the drive wheels 10 of the vehicle 1 is not restricted. Since the parking lock mechanism 41 has a known structure (for example, refer to JP 2020-59394 A), detailed illustration and description thereof will be omitted.

SBW actuator 42 is an electric actuator that switches the gear stage of the drive device 40 (transmission) in response to a control signal from an Electronic Control Unit (ECU) (not shown).

SBW actuator 42 drives the parking lock mechanism 41 in response to a control signal from ECU to switch between the locked state and the unlocked state of the parking lock mechanism 41.

SBW actuator 42 switches between the locked state and the unlocked state of the parking lock mechanism 41 in accordance with the shift position, for example, under the control of ECU. For example, SBW actuator 42 puts the parking lock mechanism 41 in an unlocked state when the shift position is in the N range, the D range, the R range, or the like, and puts the parking lock mechanism in a locked state when the shift position is in the P range or the like.

The parking lock releasing operation unit 43 is used for forcibly releasing the locked state of the parking lock mechanism 41 by manual operation. Thus, for example, in a situation where the locked state of the parking lock mechanism 41 is not automatically released, such as when SBW actuator 42 fails or when the battery of the vehicle 1 rises, the operator can manually release the locked state of the parking lock mechanism 41. The operator is, for example, a user of the vehicle 1, a serviceman arranged by the user of the vehicle 1, or the like.

The parking lock releasing operation unit 43 includes a lever 43A and a connecting member 43B.

The lever 43A is mechanically connected to a rotary shaft driven by a SBW actuator 42 in the parking lock mechanism 41. The lever 43A can rotate about its rotational axis between a position corresponding to the locked state of the parking lock mechanism 41 (hereinafter referred to as a "locked position") and a position corresponding to the unlocked state (hereinafter referred to as an "unlocked position").

For example, as shown in FIGS. 1 and 2, the lever 43A is arranged such that the unlock position is vertically lower than the lock position. Accordingly, the operator can release the locked state of the parking lock mechanism 41 and shift to the unlocked state by rotating the lever 43A downward in the locked state of the parking lock mechanism 41.

Note that the parking lock mechanism 41 has a known idling mechanism (for example, refer to JP 2020-59394 A described above), and is configured so as not to shift to the locked state even if the lever 43A is operated in the unlocked state. Further, even when the parking lock mechanism 41 is driven from the locked state toward the unlocked state by SBW actuator 42, the lever 43A is maintained in the locked position without driving the lever 43A by the action of the idling mechanism.

The connecting member 43B is an additional member coupled to the distal end of the lever 43A.

As shown in FIGS. 1 and 2, the connecting member 43B is disposed so as to hang downward from the distal end of the lever 43A, and an engagement portion capable of engaging a predetermined tool TL is provided at the distal end (lower end) of the connecting member 43B.

Further, as shown in FIG. 2, the connecting member 43B is configured such that when the lever 43A is in the unlocked position, its distal end passes through a through-hole 50H to be described later and reaches below the under cover 50. Thus, for example, as shown in FIG. 1, the operator can insert the rod-shaped tool TL from the side below the vehicle 1 and engage the tip of the tool TL with the tip of the connecting member 43B at a position slightly above the under cover 50 in the locked position of the lever 43A. Therefore, the operator can rotate the lever 43A downward via the connecting member 43B by applying a downward force to a position closer to the distal end of the tool TL than the fulcrum (see a white arrow in the drawing) using the proximal end of the tool as a fulcrum and the distal end of the tool as an action point.

As described above, the lever 43A maintains the locked position even when the parking lock mechanism 41 is driven from the locked state to the unlocked state by SBW actuator 42. Thus, the distal end of the connecting member 43B can be maintained slightly above the under cover 50 unless the connecting member 43B is manually operated by a tool TL or the like.

The connecting member 43B may be a relatively rigid member. For example, the connecting member 43B has a stiffness equal to or greater than that of the lever 43A. Accordingly, the operator can reliably operate the lever 43A through the connecting member 43B.

Further, for example, as shown in FIGS. 1 and 2, the connecting member 43B is configured by connecting a plurality of (in the present embodiment, two) members. Thus, even when there is no path for linearly hanging the connecting member 43B formed of a relatively rigid member, the connecting member 43B can be arranged so as to sew the gap between the surrounding components while changing the path at the connecting portion between the members.

The connecting member 43B may be a string-like member. For example, the connecting member 43B may be formed into a string shape by high-strength fibers (super fibers). The high-strength fibers are, for example, Kevlar fibers or aramid fibers. Accordingly, even when there is no path for linearly hanging the connecting member 43B while securing the relatively higher strength of the connecting member 43B, it is possible to arrange the gap between the surrounding components so as to sew.

The connecting member 43B may be a flexible member. For example, the connecting member 43B is a metallic wire rope. Thus, even when there is no path for linearly hanging the connecting member 43B, the gap between the surrounding components can be sewn while the path is changed by using flexibility.

In addition, a guiding member that restricts the arrangement position (hanging path) of the connecting member 43B may be provided. For example, the guide member is fixed to the side surface of the drive device 40 or the cross member 30. Accordingly, it is possible to suppress a situation in which the distal end position of the connecting member 43B is deviated from the position where the through-hole 50H is provided and the parking lock mechanism 41 cannot be manually released from the locked state. In addition, it is possible to suppress the connecting member 43B from contacting the surrounding components.

In addition, the connecting member 43B may be covered with a protective member 43C_capable of absorbing an impact caused by contacting between the connecting member 43B and other surrounding components. For example, the protective member 43C is a rubber tube. Thus, even when the nominal distance between the connecting member 43B and the other components is relatively small, both damages can be suppressed. In addition, it is possible to suppress the generation of noise caused by the contacting between the connecting member 43B and the other components, and to suppress the magnitude of the generated sound. Further, it can be used as a guiding portion that allows contacts with other surrounding components to some extent, and restricts an arrangement position (hanging path) of the connecting member 43B with other surrounding components. Therefore, it is possible to suppress the occurrence of a situation in which the distal end position of the connecting member 43B is deviated from the position where the through-hole 50H is provided, and the parking lock mechanism 41 cannot be manually released from the locked state.

The under cover 50 is provided so as to cover a lower portion of the cross member 30 and the drive device 40.

The under cover 50 is made of resin, for example, and is attached to the lower surface of the cross member 30.

The under cover 50 is provided with a through-hole 50H.

The through-hole 50H penetrates the under cover 50 vertically.

The through-hole 50H is arranged such that a distal end position of the connecting member 43B is included in the area in a plan view (lower view) of the vehicle 1. In addition, the through-hole 50H has a size that allows the tip of the tool TL inserted from the side of the vehicle 1 under the floor of the vehicle 1 to be engaged with the tip (engagement portion) of the connecting member 43B in the locked position of the lever 43A. Thus, the operator can operate the parking lock releasing operation unit 43 by engaging the tool TL with the distal end of the connecting member 43B through the through-hole 50H.

In addition, the under cover 50 may be provided with a cover member that closes the through-hole 50H from below. As a result, the through-hole 50H can be closed by the cover member while the vehicle 1 is traveling. Therefore, it is possible to suppress a decrease in the aerodynamic performance of the vehicle 1 and a decrease in the performance of avoiding road surface interference of components mounted on the cross member 30 including the drive device 40 due to the presence of the through-hole 50H while ensuring the operability of the parking lock releasing operation unit 43.

The cover member may be detachably attached to the main body of the under cover 50, or may be connected to the under cover 50 at a part of the outer edge of the through-hole 50H and rotated so as to open and close the through-hole 50H around the connection portion.

As described above, the parking lock releasing operation unit 43 is disposed so as to be exposed below the under cover 50 through the through-hole 50H, so that the operator can relatively easily manually release the parking lock mechanism 41 from the locked condition.

OTHER EMBODIMENTS

Next, another embodiment will be described.

Modifications and changes may be made to the above-described embodiments as appropriate.

For example, in the above-described embodiment, the connecting member 43B may be omitted, and the arrangement and the configuration of the lever 43A may be devised, so that the lever 43A as the parking lock releasing operation unit 43 is exposed below the under cover 50 through the through-hole 50H.

In addition, in the above-described embodiments and modifications and variations thereof, the parking lock releasing operation unit 43 may be disposed to be exposed below the under cover 50 in the locked position of the lever 43A.

In addition, in the above-described embodiment and the modification/modification example thereof, when the drive wheels 10 are front wheels, the drive device 40 may be disposed in a region in front of the cabin space of the vehicle 1 (for example, an engine compartment in a conventional vehicle). Usually, the upper part of the region is covered by a hood (lid member), and the hood is configured to be openable and closable. Since the drive device 40 is mounted at a relatively lower position in the area, other components may be placed on it, and it may be difficult to access the lever 43A from above even if the hood is opened and the area is accessible to the operator. Even in such cases, as described above, the operator can relatively easily manually release the locking status of the parking lock mechanism 41 by operating the connecting member 43B from below using a tool TL or the like.

Action

Next, the operation of the vehicle according to the present embodiment will be described.

In the present embodiment, the vehicle includes a parking lock unit, an operation unit, and an under cover. The vehicle is, for example, the vehicle 1 described above. The parking lock unit is, for example, the parking lock mechanism 41 described above. The operation unit is, for example, a parking lock releasing operation unit 43. The under cover is, for example, the above-described under cover 50. Specifically, the parking lock unit can be switched between a locked state in which the wheels of the vehicle are restrained from rotating and an unlocked state in which the wheels are not restrained from rotating by an actuator. The wheels are, for example, the above-described drive wheels 10. The actuator is, for example, SBW actuator 42 described above. The operation unit is used to switch the locked state of the parking lock unit to the unlocked state by manual operation. The under cover covers a lower portion of the operation unit. Further, the under cover is provided with a through-hole. The through-hole is, for example, the above-described through-hole 50H. Then, the operation unit is exposed from the through-hole to the lower side of the under cover.

Thus, the operator can, for example, insert a tool under the floor of the vehicle from the side of the vehicle and operate the operation unit. Therefore, the operator can manually release the locked state of the parking lock mechanism more easily.

Further, in the present embodiment, the operation unit may be located on the under cover when the manual operation is not performed, and may be exposed from the through-hole to the lower portion of the under cover when the manual operation is performed to a position corresponding to the unlocked state.

Accordingly, the vehicle can maintain a state in which the operation unit is on the undercover unless the operation unit is manually operated. Therefore, for example, it is not necessary to raise the vehicle height in order to secure the ground height between the operation unit and the ground, and it is possible to more easily realize manual release of the parking lock while suppressing deterioration in the performance of the vehicle.

Further, in the present embodiment, the operation unit may include a first operation unit that is attached to the parking lock unit so that the parking lock unit can be mechanically operated, and a second operation unit that is attached to the first operation unit. The first operation unit is, for example, the above-described lever 43A. The second operation unit is, for example, the above-described connecting member 43B. The second operation unit may be exposed from the through-hole to a lower portion of the under cover.

Thus, for example, by attaching the second operation unit to the existing first operation unit mechanically connected to the parking lock unit, the second operation unit can be exposed downward from the through-hole. Therefore, it is possible to more easily realize manual release of the parking lock while utilizing the existing first operation unit mechanically connected to the parking lock unit.

Further, in the present embodiment, the second operation unit may have the same rigidity as or higher than that of the first operation unit.

Thus, the operator can reliably operate the first operation unit mechanically connected to the parking lock unit via the second operation unit.

In addition, in the present embodiment, a plurality of members having the same rigidity as or higher than that of the first operation unit may be connected to the second operation unit.

Thus, for example, even when the second operation unit cannot be linearly suspended in relation to other components, the second operation unit can be arranged toward the through hole of the under cover so as to sew the space between the other components while changing the path at the connecting portion between the members. Therefore, it is possible to dispose the second operation unit so as to be exposed below the under cover through the through-hole while securing the relatively high rigidity of the second operation unit.

Further, in the present embodiment, the second operation unit may be covered with a protective member 43C_capable of absorbing an impact caused by contact between the second operation unit and another member. The protective member 43C is, for example, the rubber tube described above.

Thus, it is possible to suppress both damage caused by the contact between the second operation unit and the other member. In addition, it is possible to suppress the generation of sound due to the contact between the second operation unit and the other members, and to suppress the magnitude of the generated sound. Further, by allowing the contact between the second operation unit and the other member via the protective member 43C to some extent, the movement of the second operation unit can be restricted by using other parts around the second operation unit, and the tip of the second operation unit can be guided so as to be exposed downward from the through hole of the under cover.

Further, in the present embodiment, the vehicle may include a floor panel. The floor panel is, for example, the floor panel 20 described above. The parking lock unit and the operation unit may be disposed below the floor panel.

Accordingly, even when the floor panel covers the parking lock unit and the operation unit and the operation unit cannot be accessed from above, the operator can operate the operation unit from below the vehicle to relatively easily manually release the parking lock.

Although the embodiments have been described in detail above, the present disclosure is not limited to such specific embodiments, and various modifications and improvements can be made within the scope of the gist described in the claims.

What is claimed is:

1. A vehicle comprising:
   a parking lock unit that is able to switch between a locked state and an unlocked state by an actuator, the locked state being a state in which rotation of a wheel of the vehicle is restrained, and the unlocked state being a state in which the rotation of the wheel is not restrained;
   an operation unit for switching the locked state of the parking lock unit to the unlocked state by manual operation; and
   an under cover covering a space below the operation unit, wherein:
   a through hole is provided in the under cover; and
   a second operation unit is covered with a protective member able to absorb an impact caused by contact between the second operation unit and another member, wherein
   a distal end of the second operation unit is exposed to the space below the under cover through the through hole in the unlocked state.

2. The vehicle according to claim 1, wherein:
   the first operation unit and the second operation unit are positioned above the under cover when the manual operation is not performed; and
   when the manual operation is performed on the operation unit to a position corresponding to the unlocked state, the distal end of the second operation unit is exposed to the space below the under cover through the through hole.

3. The vehicle according to claim 1, wherein:
   the operation unit is attached to the parking lock unit such that the parking lock unit is mechanically operable.

4. The vehicle according to claim 1, wherein the second operation unit has a rigidity equal to or higher than a rigidity of the first operation unit.

5. The vehicle according to claim 4, wherein the second operation unit is composed of a plurality of members having a rigidity equal to or higher than the rigidity of the first operation unit being connected to each other.

6. The vehicle according to claim 1, further comprising a floor panel, wherein the parking lock unit and the operation unit are disposed below the floor panel.

* * * * *